United States Patent
Kim et al.

(10) Patent No.: US 9,439,143 B2
(45) Date of Patent: Sep. 6, 2016

(54) METHOD AND DEVICE FOR POWER SAVING MODE CONTROL IN MOBILE COMMUNICATION SYSTEM

(71) Applicant: Samsung Electronics Co., Ltd, Gyeonggi-do (KR)

(72) Inventors: Sangbum Kim, Gyeonggi-do (KR); Gert-Jan Van Lieshout, Apeldoorn (NL); Soenghun Kim, Gyeonggi-do (KR); Wooseong Kim, Gyeonggi-do (KR); Kyeongin Jeong, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/708,055

(22) Filed: May 8, 2015

(65) Prior Publication Data

US 2015/0327170 A1 Nov. 12, 2015

(30) Foreign Application Priority Data

May 8, 2014 (KR) ........................ 10-2014-0054811

(51) Int. Cl.
*H04B 1/38* (2015.01)
*H04W 52/02* (2009.01)
*H04W 76/02* (2009.01)

(52) U.S. Cl.
CPC ..... *H04W 52/0216* (2013.01); *H04W 52/0212* (2013.01); *H04W 76/02* (2013.01); *H04W 52/0261* (2013.01); *H04W 52/0274* (2013.01); *Y02B 60/50* (2013.01)

(58) Field of Classification Search
CPC ................... H04W 52/0212; H04W 52/0261; H04W 52/0274; H04W 76/02

USPC .......................................................... 455/574
See application file for complete search history.

(56) References Cited

U.S. PATENT DOCUMENTS

| 2012/0269122 A1 | 10/2012 | Lee |
| 2013/0028184 A1 | 1/2013 | Lee et al. |
| 2013/0136047 A1 | 5/2013 | Zhang et al. |
| 2013/0210467 A1 | 8/2013 | Kim et al. |

FOREIGN PATENT DOCUMENTS

| KR | 20120041141 A | 4/2012 |
| KR | 20130140148 A | 12/2013 |
| WO | WO 2014/062156 A1 | 4/2014 |

OTHER PUBLICATIONS

International Search Report dated Aug. 20, 2015 in connection with International Application PCT/KR2015/004608; 5 pages.

*Primary Examiner* — Charles Shedrick

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

A method for Power Saving Mode (PSM) operation control of a UE in a mobile communication system is provided. The method includes: setting a PSM for the UE; triggering a connection request of the UE in the PSM; determining whether the connection request has been barred; and maintaining the PSM setting when it is determined that the connection request has been barred.

21 Claims, 10 Drawing Sheets

METHOD AND DEVICE FOR POWER SAVING MODE CONTROL IN MOBILE COMMUNICATION SYSTEM

CROSS-REFERENCE TO RELATED APPLICATION AND CLAIM OF PRIORITY

The present application is related to and claims the benefit under 35 U.S.C. §119(a) of Korean Patent Application No. 10-2014-0054811, filed on May 8, 2014, which is hereby incorporated by reference for all purposes as if fully set forth herein.

TECHNICAL FIELD

The present disclosure relates to a method and device for power saving mode control in a mobile communication system. More specifically, the present disclosure relates to a method and device for minimizing power consumption of a UE and effectively controlling an Access Stratum (AS) timer when a Power Saving Mode (PSM) is applied to the UE.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In general, mobile communication systems have been developed to provide communication while securing mobility of users. With the rapid development of technologies, the mobile communication systems have reached a stage of providing high-speed data communication services as well as voice communication. Recently, next-generation mobile communication systems have evolved into Human to Human (H2H) communication, Human to Machine (H2M) communication, and Machine to Machine (M2M) communication. In the 3GPP communication standard, standardization of machine type communication has been progressed to meet such demands. In the 3GPP SA1 Working Group (WG) standard defining services and characteristics thereof, service requirements for the machine type communication have already been discussed.

SUMMARY

To address the above-discussed deficiencies, it is a primary object to provide a method and device for efficient power consumption control in a mobile communication system. More specifically, an aspect of the present disclosure is to provide a method and device for minimizing power consumption of a UE and effectively controlling an Access Stratum (AS) timer when a Power Saving Mode (PSM) is applied to the UE.

In accordance with one aspect of the present disclosure, a method for Power Saving Mode (PSM) operation control of a UE in a mobile communication system is provided. The method includes: setting a PSM for the UE; triggering a connection request of the UE in the PSM; determining whether the connection request has been barred; and maintaining the PSM setting when it is determined that the connection request has been barred.

In accordance with another aspect of the present disclosure, a UE device for Power Saving Mode (PSM) operation control in a mobile communication system is provided. The UE device includes: a transmission/reception unit that communicates with at least one network node and a controller that sets a PSM for the UE, triggers a connection request of the UE in the PSM, determines whether the connection request has been barred, and makes a control to maintain the PSM setting when it is determined that the connection request has been barred.

Embodiments of the present disclosure provide a method and device for efficient power consumption control in a mobile communication system.

In addition, the embodiments of the present disclosure provide a method and device for minimizing power consumption of a UE when a Power Saving Mode (PSM) is applied to the UE.

Furthermore, the embodiments of the present disclosure provide a method and device for effectively controlling an Access Stratum (AS) timer when a power saving mode is applied to a UE.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other objects, features, and advantages of the present disclosure will be more apparent from the following detailed description in conjunction with the accompanying drawings, in which.

DETAILED DESCRIPTION

Figure 1:
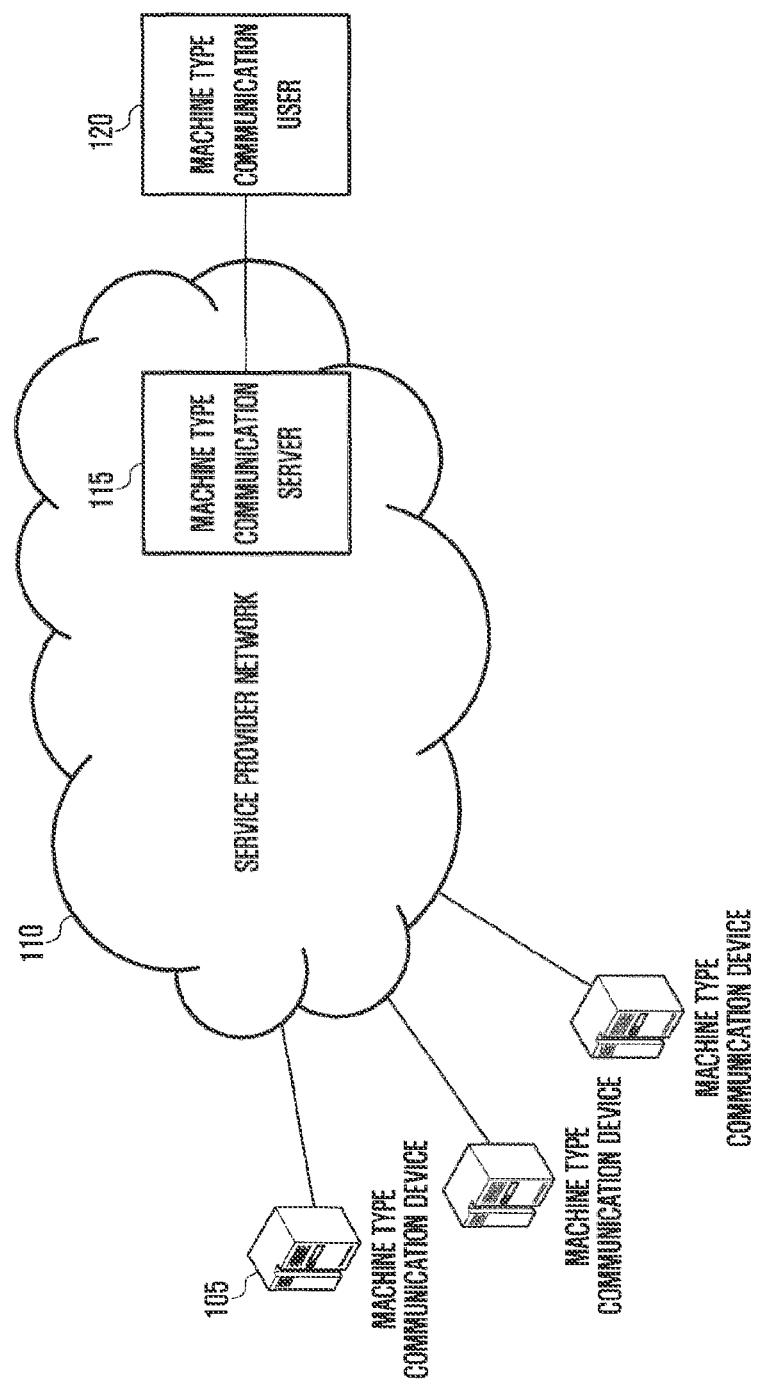
FIG. 1 illustrates a communication scenario in machine type communication.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system. Hereinafter, various embodiments will be described with reference to the accompanying drawings. It should be noted that the same elements will be designated by the same reference numerals although they are shown in different drawings. Further, a detailed description of a known function and configuration which may make the subject matter of the present disclosure unclear will be omitted. Hereinafter, it should be noted that only the descriptions will be provided that may help understanding the operations provided in association with the various embodiments of the present disclosure, and other descriptions will be omitted to avoid making the subject matter of the present disclosure rather unclear.

FIG. 1 illustrates a communication scenario in machine type communication. Machine type communication devices 105 are connected to a wireless communication service provider network 110. The machine type communication devices may be generally defined as various unmanned devices, such as meters or automatic vending machines, and have different characteristics from existing wireless terminals in various aspects. In addition, the machine type communication devices can have different characteristics according to the types thereof.

There may be a large number of machine type communication devices having such various characteristics in a cell. A machine type communication server 115 having information on the machine type communication devices not only performs authentication but also functions to collect information from the machine type communication devices and transfer the collected information to a machine-type-communication user 120. The machine type communication server may exist inside or outside the wireless communication service provider network 110. The machine-type-communication user is an end user that requires information transferred from the machine type communication devices.

Machine type communication has different characteristics from the existing wireless communication. In addition, the characteristics are very diversely classified according to the purpose of use of the machine type communication. For example, machine type communication devices requiring communication several times a day regardless of time have a characteristic of 'Time Tolerant', and machine type communication devices installed in a place to collect and transmit particular information without mobility have a characteristic of 'low mobility.' Accordingly, wireless communication service providers have to provide services in view of such various characteristics of the machine type communication devices and coexistence with existing terminals.

Among the machine type communication devices, devices associated with tracking of animals or freight cars are generally powered by a battery or self-generated electric power. Therefore, since the machine type communication devices have to use limited power, it is desirable that the machine type communication devices efficiently use extremely small power. The 3GPP SA1 WG has defined an extra low power consumption mode, and the machine type communication devices may be set to use low power in the corresponding mode.

The present disclosure relates to a method and device for minimizing power consumption of a UE and effectively controlling an Access Stratum (hereinafter, referred to as 'AS') timer when a Power Saving Mode (hereinafter, referred to as 'PSM') is applied to the UE in a Long Term Evolution (LTE) based mobile communication system. Though a UE has tried Mobile Originated (MO) calls for a PSM time interval, if the UE has been rejected, the UE changes from the PSM to an idle mode. The MO calls mean calls sent by the UE. The present disclosure is characterized in that a PSM is extended until a subsequent call is retried in order to minimize power consumption of a UE. In addition, the present disclosure is characterized in that during a PSM, a system is effectively controlled by making operations of various types of AS timers different according to the roles thereof rather than deactivating all idle mode operations at one time. However, the scope of the present disclosure is not limited only to the LTE based mobile communication system, and communication systems to which all changed or modified forms deduced based on the spirit of the present disclosure may be applied are to be construed as being included in the scope of the present disclosure.

Prior to a detailed description of the present disclosure, an idle mode and a PSM will be described first.

In the LTE standard technology, an idle mode means a state in which a UE is powered on but does not communicate with a base station. Although not communicating with the base station, the UE in the idle mode performs the following operations.

Public Land Mobile Network (PLMN) selection

Cell selection and reselection

Location registration

Support for manual CSG selection

In order to perform the operations, the UE has to periodically measure signals of a serving cell and neighboring cells. In addition, the UE has to receive and decode system information of a cell to collect base station information according to a necessity. For such operations, the UE has to consume power thereof.

Special purpose UEs have to very actively save power consumption. For example, since Machine Type Communication (MTC) devices, such as meters, automatic vending machines, and the like, communicate with a base station once a week or once a month, the devices do not have to consistently perform idle mode operations. Therefore, in order to minimize power consumption, the unnecessary idle mode operations can be suppressed. To this end, a PSM is being discussed in the LTE standard technology. The PSM means that a UE never performs general idle mode operations for a predetermined time interval.

Figure 2:
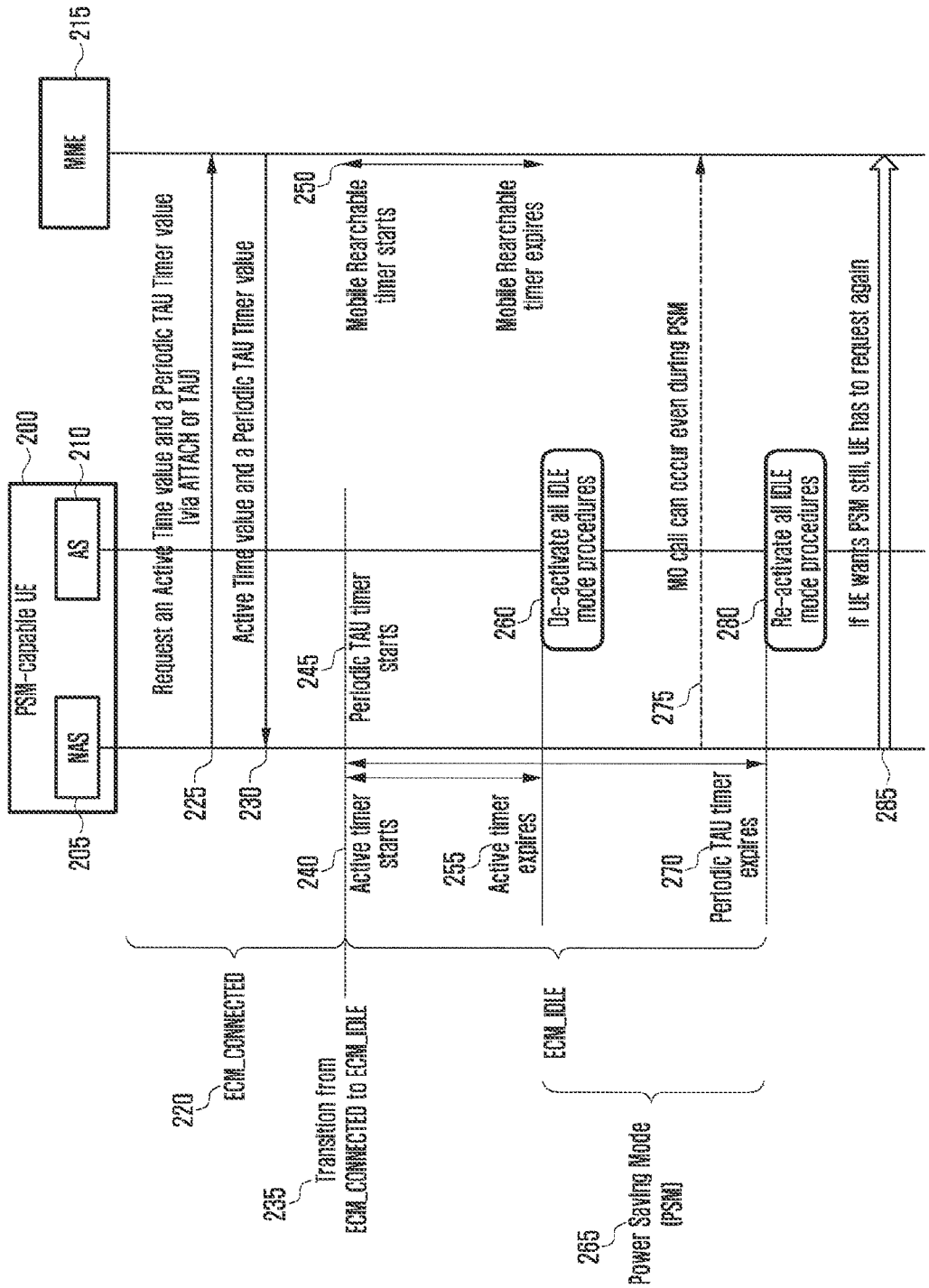
FIG. 2 is a diagram illustrating a power saving mode.

FIG. 2 is a diagram illustrating a power saving mode. A network includes a UE 200 supporting a Power Saving Mode (PSM) and a Mobility Management Entity (MME) 215. Here, communication between the UE 200 and the MME 215 can be made through a base station (eNB). A Non-Access Stratum (NAS) 205 of the UE 200 supporting the PSM requests a setting of the PSM from the MME 215 of the network (Step 225). The request can be made when the UE 200 performs an ATTACH or a Tracking Area Update (TAU) for the MME 215.

The ATTACH means a procedure in which the UE 200 is authenticated by the MME 215 and then registered therein. The MME 215 provides registered PLMN information and equivalent PLMN information to the UE through the ATTACH process. The TAU process is performed in order that the UE 200 informs the network of the location thereof. In the LTE standard technology, the network locates the UE in units of Tracking Areas (TAs) for the purpose of paging. TA is a single cell or a set of a plurality of cells. When the moving UE 200 enters another TA, the UE 200 informs the network that the UE enters a new TA. Since the UE 200 has to communicate with the MME 215 in order to perform the ATTACH process and the TAU process, the UE 200 has to naturally change to a connection mode 220 from an idle mode.

In step 230, the MME 215 approves the PSM request of the UE 200 and provides two types of timer values to the UE. One is an active timer 240, and the other is a periodic TAU timer 245. The two timers 240 and 245 start when the UE 200 changes to the idle mode from the connection mode (Step 235). In addition, the MME 215 also simultaneously starts one mobile researchable timer (Step 250). Until the expiration time of the active timer 240 (Step 255), the UE 200 performs the aforementioned idle mode operations.

At the expiration time of the active timer 240 (Step 255), the UE 200 changes to a PSM 265 to deactivate all the idle mode operations and AS timers (Step 260). When the periodic TAU timer 245 expires (Step 270) or an MO call is triggered (Step 275), the UE 200 exits the PSM to the idle mode and performs the idle mode operations (Step 280). If the UE 200 wants to trigger the PSM again, the UE 200 has to request a PSM from the MME 215 (Step 285).

In an embodiment of the present disclosure, after an MO call is rejected in a PSM operation, the PSM is extended to minimize power consumption of a UE until the next MO call is retried.

Figure 3A:
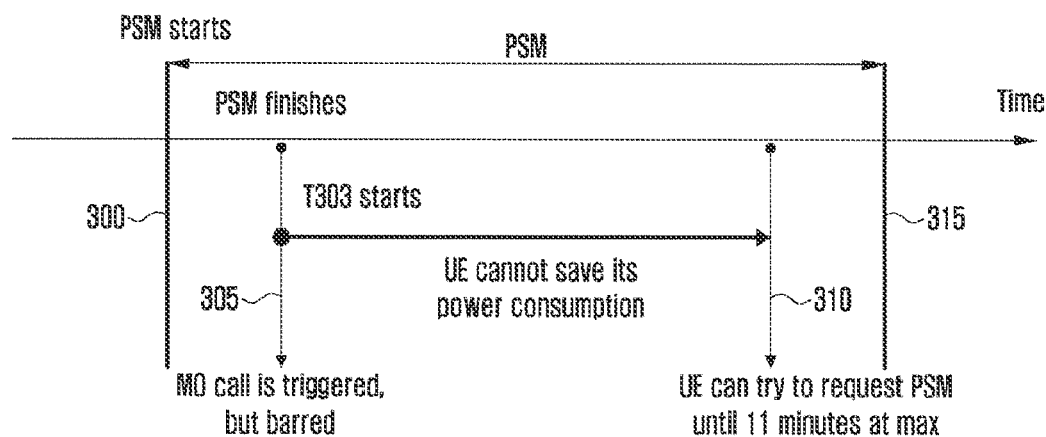
FIGS. 3A and 3B illustrate an existing PSM operation and a method of extending a PSM until a subsequent MO call is retried according to an embodiment of the present disclosure.
Figure 3B:
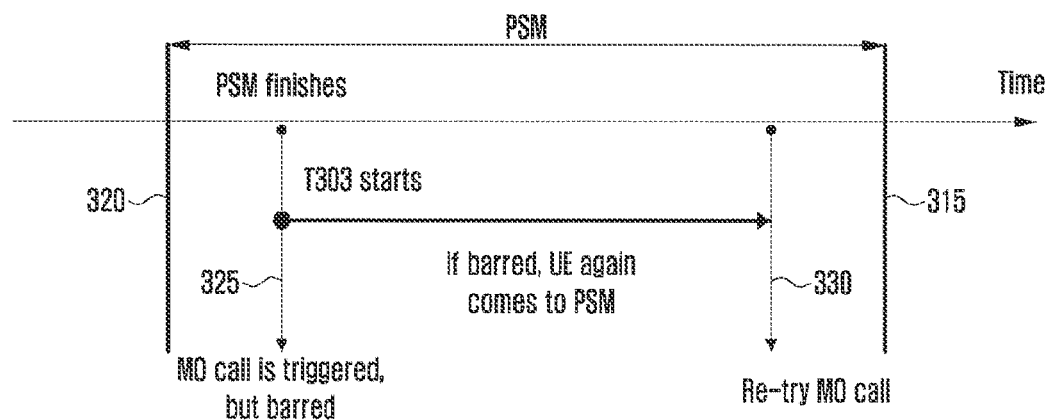

FIGS. 3A and 3B illustrate an existing PSM operation and a method of extending a PSM until a subsequent MO call is retried according to an embodiment of the present disclosure. FIG. 3A illustrates the existing operation. When an MME approves a PSM requested by a UE, the UE starts the PSM at a time point 300. Although the PSM finishes at a time point 315, if the UE triggers an MO call, the UE deactivates the PSM and changes to an idle mode when the UE triggers the MO call (305) irrespective of the expiration time point of the PSM. The UE triggers the MO call and checks Access Class Barring (ACB).

The ACB means that a base station broadcasts barring information on the access of the UE when determining that a network is congested. The UE stores the barring information and identifies whether the access of the UE is barred when the access is necessary. If the access of the UE is considered to be barred, the UE is barred from accessing the network again for a predetermined period of time.

The predetermined period of time is determined by a timer, in which a T303 timer is used for an MO call, a T305 timer is used for MO signaling, and a T306 timer is used for an MO CS fallback. If the MO call is permitted by the ACB, the UE performs RRC connection establishment for communication with a base station. If the MO call is not permitted, the UE is considered to be barred, and the T303 timer starts. The UE may not trigger the MO call again until the T303 timer expires (310) and maintains the idle mode.

The MO call, the MO signaling, and the MO CS fallback may be named as connection request messages of the UE. Meanwhile, in the following description, an embodiment of the present disclosure will be described with the MO call as an example of the connection request messages. However, the scope of the present disclosure should not be construed as being limited to the MO call, and the present disclosure may be applied even when the MO signaling or the MO CS fallback is applied.

In general, the T303 timer may be set up to about 11 minutes. Therefore, the UE has to maintain the idle mode for 11 minutes. The UE has to consume power to perform idle mode operations in the idle mode. Since the UE needs to communicate with the base station in order to request the PSM again, the UE has to stand by until the T303 timer expires.

In the present disclosure, the MO call is triggered for the PSM time interval. However, when the access of the UE is barred, the PSM is extended until a subsequent MO call is retried in order to minimize power consumption of the UE.

FIG. 3B illustrates an improved scheme proposed in an embodiment of the present disclosure. When an MME approves a PSM requested by a UE, the UE starts the PSM at a time point 320. Although the PSM finishes at a time point 315, if the UE triggers an MO call, the UE deactivates the PSM and performs ACB checking when the UE triggers the MO call (325) irrespective of the expiration time point of the PSM. Through the ACB checking, the UE can determine whether the access or call of the UE is permitted.

When the call is permitted, the UE performs RRC connection establishment for communication with a base station. When the call is not permitted, the UE starts a T303 timer. At this time, the UE maintains the PSM as it is while operating only the T303 timer, without changing to an idle mode. That is, the UE does not perform any idle mode operations that are not associated with the T303 timer operation. In addition, the UE does not permit the MO call while maintaining the PSM until the T303 timer expires (330).

Namely, the MO call in the PSM is barred while the T303 timer is operating. In this regard, the present disclosure differs from the existing technology of permitting the trigger of the MO call for the PSM time interval. If the MO call is not triggered, the PSM finishes when a periodic TAU timer expires. If the periodic TAU time expires before the T303 timer, the UE maintains the PSM until the T303 timer expires, or changes to the idle mode. However, the UE may still not trigger the MO call until the T303 timer expires.

Figure 4:
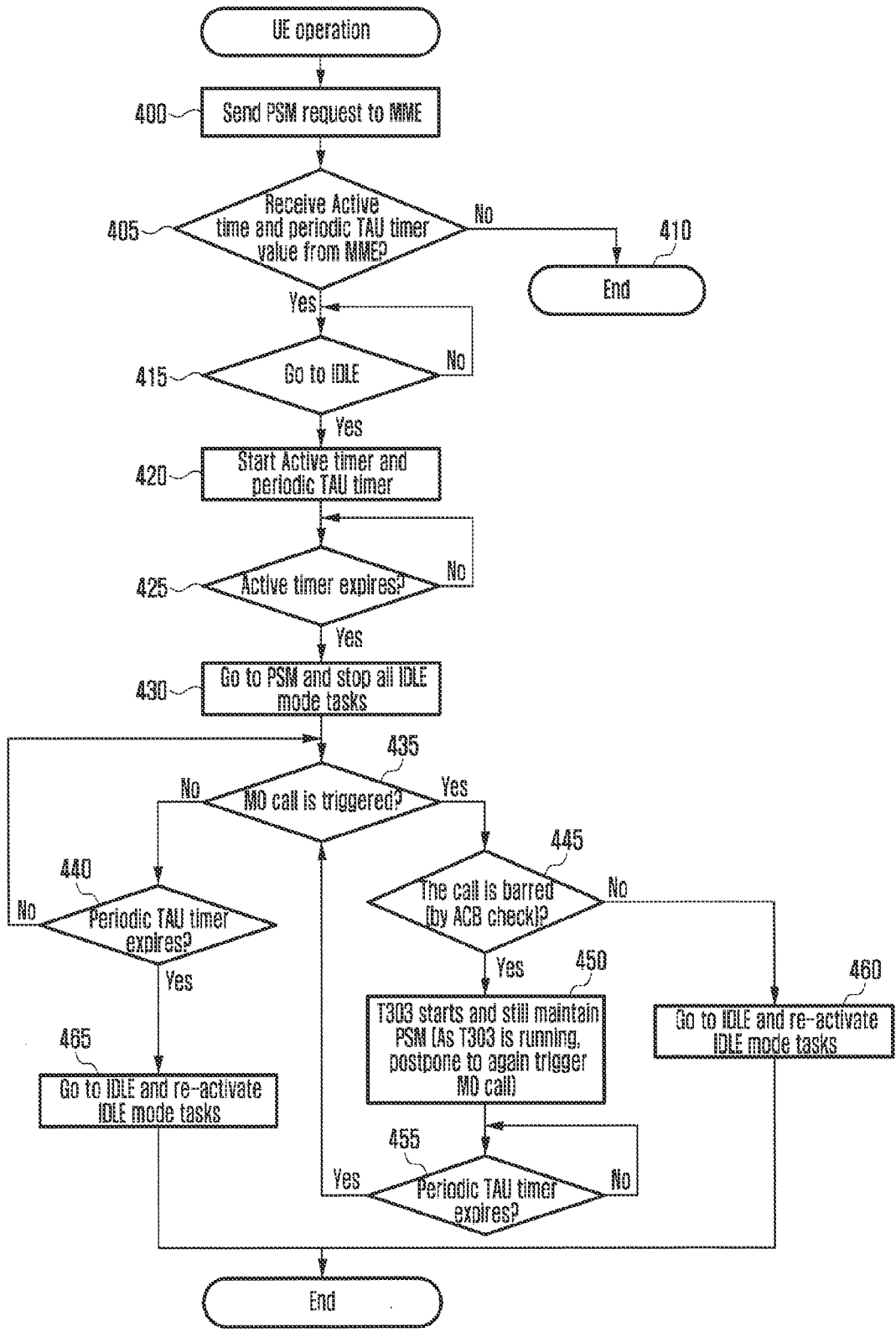
FIG. 4 is a flowchart illustrating a method of extending a PSM until a subsequent MO call is retried according to an embodiment of the present disclosure.

FIG. 4 is a flowchart illustrating a method of extending a PSM until a subsequent MO call is retried according to an embodiment of the present disclosure. In step 400, a UE sends a PSM request to an MME. In step 405, the UE identifies whether an active timer value and a periodic TAU timer value are received from the MME. If not, the UE determines that the MME has not permitted the PSM request, and terminates the operation regarding the PSM request (Step 410).

When the active timer value and the periodic TAU timer value are received from the MME, the UE proceeds to step 415. In step 415, the UE identifies whether to change to an idle mode. When it is determined that the UE has changed to the idle mode, the UE proceeds to step 420. In step 420, the UE starts the active timer and the periodic TAU timer, which are received from the MME, at the same time as changing to the idle mode. The UE maintains the idle mode until the active timer expires. In step 425, the UE identifies whether the active timer expires. When the active timer has expired, the UE proceeds to step 430. In step 430, the UE changes to a PSM and deactivates all the idle mode operations.

In step 435, for the PSM time interval, the UE identifies whether an MO call is triggered. If the MO call is not triggered, the UE proceeds to step 440. In step 440, the UE identifies whether the periodic TAU timer expires. If the periodic TAU timer does not expire, the UE proceeds to step 435. When the periodic TAU timer expires, the UE changes to the idle mode and performs all the idle mode operations again in step 465.

If the MO call is triggered in step 435, the UE, in step 445, determines whether the access to the MO call is permitted, using ACB information received in advance from a base station. When the access to the MO call is permitted, the UE proceeds to step 460. In step 460, the UE performs RRC connection establishment for communication with the base station.

If the access to the MO call is not permitted, the UE proceeds from step 445 to step 450. In step 450, the UE starts a T303 timer and still maintains the PSM. In addition, when the T303 timer is operating, the MO call is not permitted despite the PSM time interval. In order to trigger the MO call again, the UE has to stand by until the T303 timer expires. When the T303 timer expires in step 455, the UE retries the MO call in step 435.

An embodiment of the present disclosure is characterized in that, when entering a Power Saving Mode (PSM), a system is effectively controlled by making operations of various types of Access Stratum (AS) timers different according to the roles thereof rather than deactivating all the AS timers at one time.

Various AS timers exist in LTE standard technologies. Each AS timer is operated for a predetermined purpose. ACB related timers include a T303 timer, a T305 timer, and a T306 timer. The ACB related timers have already been mentioned. Each timer is associated with a particular service and starts when the corresponding service is barred in the ACB checking A time of the timer is determined according to a predetermined rule using parameter information broadcast by a base station. An AS timer associated with RRC connection rejection is a T302 timer. The base station may reject an RRC connection request of a UE. An RRC message used in this case is the RRC connection rejection. The RRC message includes waitTime IE which is the time of the T302 timer. The UE cannot retry to access until the timer expires.

T320 and T325 timers relate to cell re-selection. The T320 timer is used to determine an effective time when a frequency priority provided by the base station is applied. The base station provides frequency priority information to use when re-selecting a cell, to the UE through an RRC connection release message. The priority information is not always effective for an infinite time interval and is applied to the UE only for a predetermined period of time. The predetermined period of time is T320. In addition, the base station performs signaling using an RRC connection rejection message such that a priority for a current serving frequency or a system (RAT) is considered to be low. Also, the instruction is not always effective for an infinite time interval and is effective only until the T325 timer expires. An AS timer related to Minimization of Drive Test (MDT) includes a T330 timer and a 48-hour timer. The MDT refers to a technology in which a UE collects and records cell measurement information in order to optimize a cell service area. The operation of recording the cell measurement information is performed only while the T330 timer is operating. When the T330 timer expires, the UE has to store the cell measurement information without deleting the information for up to 48 hours until the base station requests the UE to report the information. This is referred to as the 48-hour timer.

As described above, the AS timers are intentionally operated. If all the AS timers are deactivated at one time since the UE enters the PSM, the UE performs an unintended operation.

Figure 5:
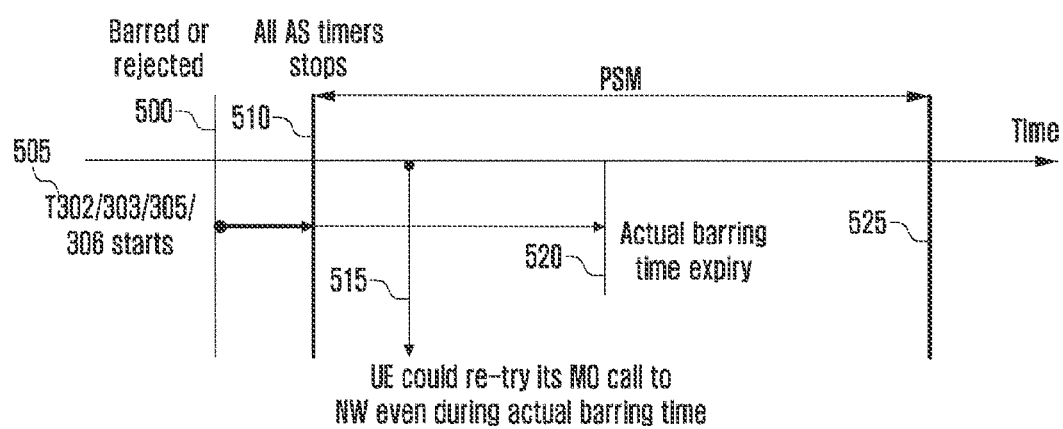
FIG. 5 illustrates operations of AS timers related to Access Class Barring (ACB) and RRC connection rejection according to an embodiment of the present disclosure.

FIG. 5 illustrates operations of AS timers related to Access Class Barring (ACB) and RRC connection rejection according an embodiment of the present disclosure. T302/303/305/306 timers (505) are used to bar access from a UE. That is, if the access is barred by ACB checking (500), or connection establishment is rejected by an RRC connection rejection message, the UE cannot try to access again until the timers expire (520).

However, when the UE enters a Power Saving Mode (PSM), the UE deactivates all Access Stratum (AS) timers.

Since the UE is allowed to trigger an MO call for the PSM time interval, the UE retries the access even before the timers expire (515). This is to avoid intensions when the AS timers were defined. It is not desirable.

Accordingly, the present disclosure proposes methods for avoiding such a situation. In the first method, the UE, before setting a Power Saving Mode (PSM) for a Mobility Management Entity (MME), identifies whether any one of the T302/303/305/306 timers is operating. If any timer is operating, the UE stops requesting the PSM setting. Since the UE does not enter the PSM while the timers are operating, the UE cannot try access until the timers expire.

The reason why the timers operate is because the UE needs communication with a base station from the beginning Although the UE fails to communicate due to methods, such as ACB, for suppressing a network congestion situation, the UE needs to communicate with the base station. Accordingly, even though such a UE requests the PSM, the UE is more likely to immediately request an MO call again. It is inefficient to request the PSM setting, and the UE may cause only signaling overhead. Therefore, the method of suppressing the PSM setting can be one efficient method.

In the second method, the timers continue to perform timer operations and timer related operations even though the UE enters the PSM. The UE deactivates idle mode operations, which are not associated with the timers, to save power consumption thereof.

In the last method, although the UE actually deactivates the AS timers, the UE may not inform the UE Non-Access Stratum (NAS) of such deactivation, or may request the UE NAS not to transmit a service request to the UE Access Stratum (AS) until the timers expire. In the LTE standard technology, the UE NAS transmits a service request to the UE AS. After ACB checking, when the request is barred, the UE AS informs of that and starts one of the T303/305/306 timers according to the type of service, namely, an MO call, MO signaling, or an MO CS fallback. If the timer expires, the UE AS informs the UE NAS that the UE NAS may request a service again since the timer expires. At this time, the UE NAS transmits a service request to the UE AS again. Therefore, the present disclosure proposes a method in which even though the AS timers are actually deactivated, the UE does not inform the UE NAS of the deactivation or informs the UE NAS of the expiration time of the timers, thereby preventing the UE NAS from transmitting a service request until the expiration time.

Figure 6:
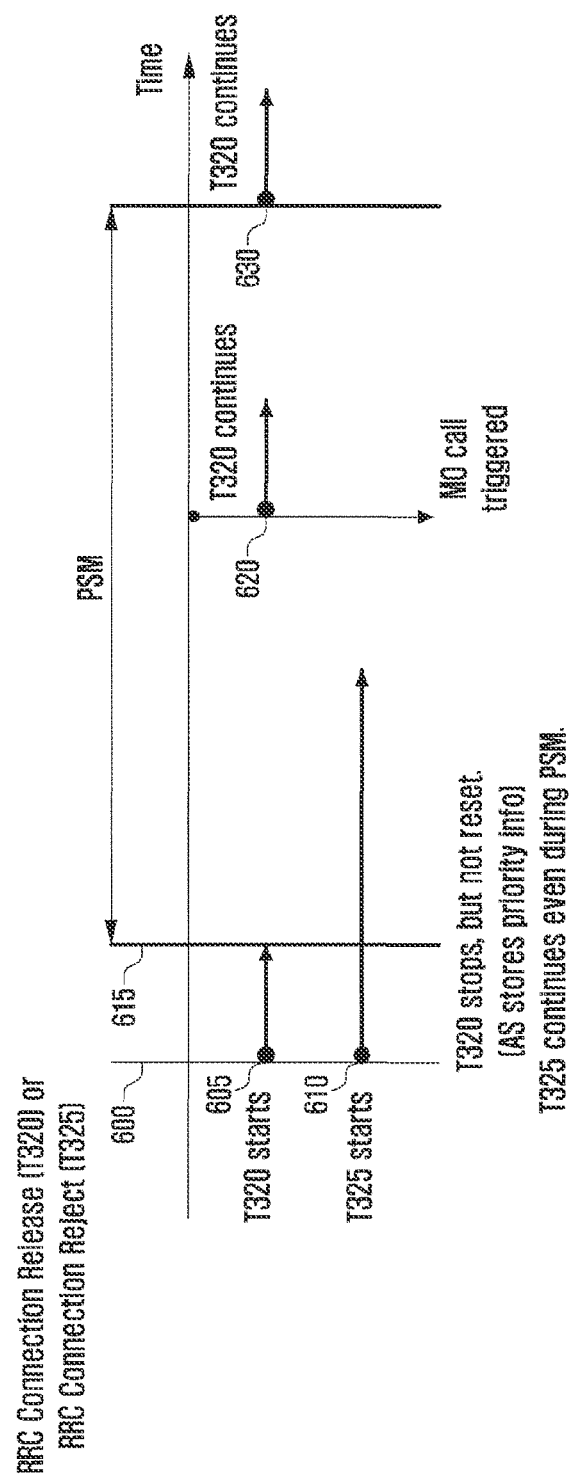
FIG. 6 illustrates operations of AS timers related to cell re-selection according to an embodiment of the present disclosure.

FIG. 6 illustrates operations of AS timers related to cell re-selection according to an embodiment of the present disclosure. A base station transmits a Radio Resource Control (RRC) connection release message to a UE to terminate a connection with the UE (600). At this time, the base station provides the UE with frequency priority information that the UE will consider when performing cell re-selection through the RRC message. The information is effective only for a finite time interval and is managed using a T320 timer. Considering that the maximum value of the T320 timer is three hours in the LTE standard technology, the frequency priority information does not frequently change. Therefore, a UE having terminated a PSM or a UE having triggered an MO call effectively performs cell re-selection using the frequency priority information.

To this end, in the embodiment of the present disclosure, when the UE enters a PSM, if there is a T320 timer in operation (605), the UE deactivates the T320 timer but does not reset the same (615), and when the UE triggers an MO call (620) or the PSM is terminated (630), the UE operates the deactivated T320 timer in succession. In addition, until the T320 timer expires, the UE uses the frequency priority information, included in the RRC connection release message received from the base station, without deleting the same. Furthermore, using the RRC connection release message (600), the base station instructs the priority of the current frequency to be lowered.

A T325 timer is used to prevent the UE from reselecting a corresponding cell for a predetermined period of time due to a problem of the current frequency or a network congestion situation in a system. The network congestion situation is less likely to continue until the PSM having a very long time interval is terminated. In the LTE standard technology, the maximum value of the T325 timer is 30 minutes. If the UE terminates the T325 timer after entrance to the PSM, the UE tries to access the corresponding frequency or the system in the congestion situation when trying an MO call for the PSM time interval. This is an unintended operation. Accordingly, in the embodiment of the present disclosure, when the UE enters the PSM (615), if the T325 timer is operating (610), the T325 continues irrespective of the PSM time interval. In addition, when the UE triggers an MO call while the T325 timer is operating, the UE does not try to access the serving frequency or system when an RRC connection rejection message is received.

Figure 7:
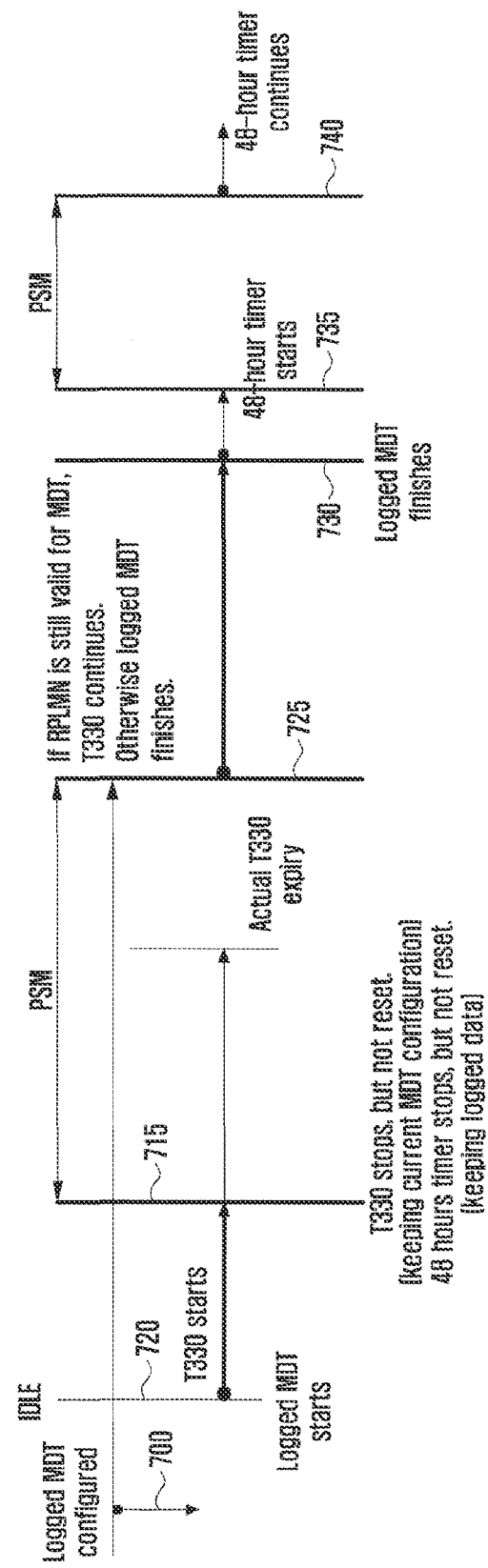
FIG. 7 illustrates operations of AS timers related to an MDT according to an embodiment of the present disclosure.

FIG. 7 illustrates operations of AS timers related to an MDT according to an embodiment of the present disclosure. A UE receives MDT setting information on a logged MDT from a base station in a connection mode (700). The logged MDT is a technology in which when the UE changes to the connection mode after collecting and storing cell measurement information in an idle mode, the UE reports that to the base station. The cell measurement information is used for a service provider to optimize a service network.

When the UE receives the MDT setting information and changes from the connection mode to the idle mode, the UE performs the logged MDT and starts a T330 timer. The UE performs the logged MDT until the T330 timer expires. When the UE enters a PSM while performing the MDT and sustains the T330 timer, the UE has to stop the MDT operation with the cell measurement information uncollected (720). Since the UE does not perform cell measurement in the PSM, the UE has no information to store. Accordingly, in the embodiment of the present disclosure, when entering the PSM, if the UE is performing the logged MDT while the T330 timer is operating, the UE deactivates the logged MDT and the T330 timer but does not reset the T330 timer (715).

In addition, the UE also stores the setting information on the logged MDT without deleting the same. When the UE terminates the PSM, the UE performs the logged MDT again using the stored MDT setting information when the current registered PLMN (RPLMN) is in agreement with at least one of PLMNs belonging to a PLMN MDT list. Furthermore, the deactivated T330 timer is also operated again (725). When the T330 timer expires, the UE does not perform the logged MDT any more (730). At this time, the UE starts a 48-hour timer having a length of 48 hours (735). The cell measurement information and the MDT setting information which the UE stores until the 48-hour timer expires are not deleted. The 48-hour timer is a requirement that prevents the UE from removing the stored information until the UE reports the stored information to the base station. If the base station requests the report from the UE only within the time, the base station acquires information useful for network optimization.

In the embodiment of the present disclosure, the UE deactivates the timer without resetting the same when entering the PSM (735), and operates the timer again when the PSM is terminated (740). Due to this, the base station is guaranteed the reporting time of 48 hours irrespective of the PSM setting.

Figure 8:
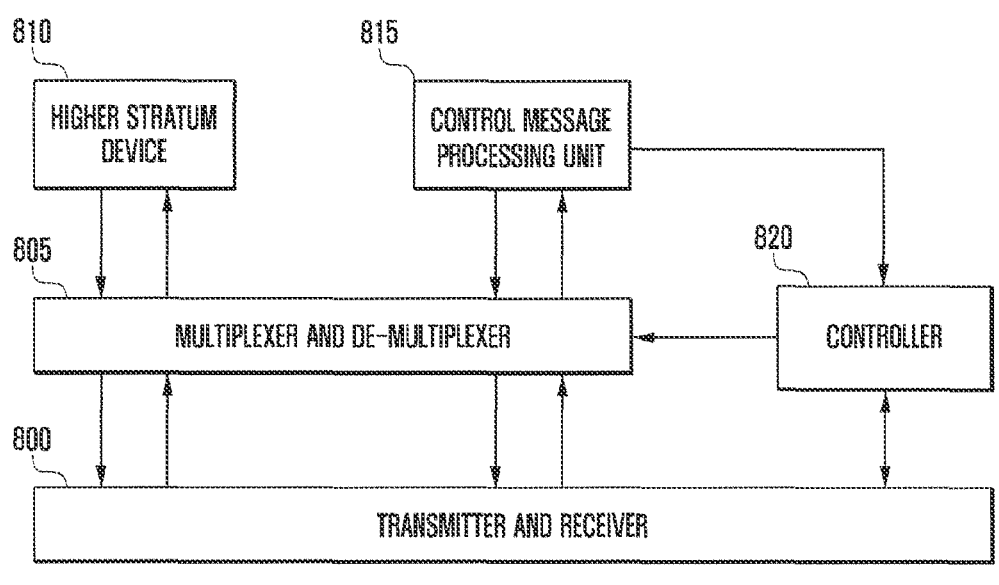
FIG. 8 is a block diagram illustrating a configuration of a UE according to an embodiment of the present disclosure.

FIG. 8 is a block diagram illustrating a configuration of a UE to which the present disclosure is applied.

Referring to FIG. 8, the UE transmits/receives data to/from a higher stratum device 810 and transmits/receives control messages through a control message processing unit 815. When the UE transmits a control signal or data to a base station, the UE multiplexes the data through a multiplexer 805 and then transmits the same through a transmitter 800 under the control of the controller 820. In contrast, when the UE receives a physical signal, the UE receives the physical signal through a receiver 800, de-multiplexes the received signal through a de-multiplexer 805, and transfers the received signal to the higher stratum device 810 or the control message processing unit 815 under the control of the controller 820.

For convenience of description, the configuration of the UE has been illustrated with the divided blocks. However, it should be understood that the configuration of the UE does not necessarily have to be divided as described above in the embodiment of the present disclosure. For example, the UE can be configured with a transmission/reception unit communicating with at least one node and a controller for controlling the overall operation of the UE. In this case, according to the embodiment of the present disclosure, the controller can: set a PSM for the UE; trigger a connection request of the UE in the PSM; determine whether the connection request is barred; and make a control to maintain the PSM setting when the connection request is barred.

In addition, the controller controls to maintain the PSM setting until a timer expires which bars a Radio Resource Control (RRC) connection setting for at least the connection request. In this case, the connection request includes at least one of: a call, signaling, or a Circuit Switched (CS) fallback, which are generated from the UE.

Further, the controller controls to bar an operation corresponding to the connection request for a time interval during which the PSM setting is maintained. Furthermore, the controller, before the step of setting the PSM, determines whether a timer barring the access of the UE is operating, and when it is determined that the timer is operating, the controller controls to deactivate the PSM setting operation.

Moreover, the controller, before the step of setting the PSM, determines whether a timer barring the access of the UE is operating, and when it is determined that the timer is operating, the controller controls to continue to perform the timer and timer related operations after the PSM setting.

Also, the controller, before the step of setting the PSM, determines whether a timer barring the access of the UE is operating, and when it is determined that the timer is operating, the controller controls such that, when the PSM is set, the UE Non-Access Stratum (NAS) stops a service request until the expiration of the timer.

The operation of the controller of the UE has been described above. However, in the embodiment of the present disclosure, the operation and function of the UE controller is not limited to the description of FIG. 8, and the UE controller controls the operation of the UE described through FIGS. 1 to 7.

Figure 9:
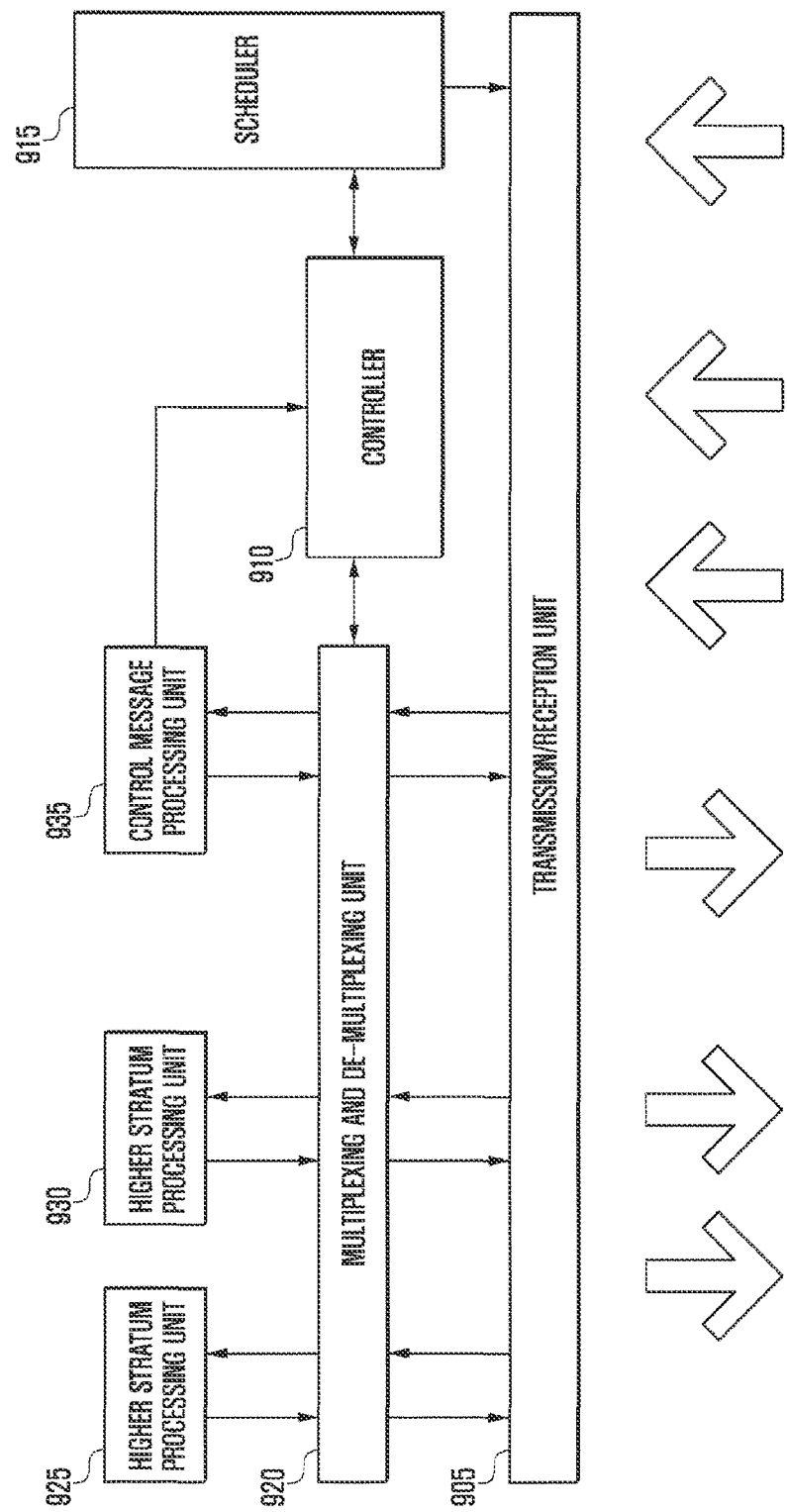
FIG. 9 is a block diagram illustrating a configuration of a base station according to an embodiment of the present disclosure.

FIG. 9 is a block diagram illustrating a configuration of a base station according to an embodiment of the present disclosure. Referring to FIG. 9, the base station device of FIG. 9 includes a transmission/reception unit 905, a controller 910, a multiplexing and de-multiplexing unit 920, a control message processing unit 935, various types of higher stratum processing units 925 and 930, and a scheduler 915. The transmission/reception unit 905 transmits data and a predetermined control signal through a forward carrier and receives data and a predetermined control signal through a backward carrier. In cases where a plurality of carriers is set, the transmission/reception unit 905 transmits and receives data and a control signal through the plurality of carriers. The multiplexing and demultiplexing unit 920 multiplexes data generated by the higher stratum processing units 925 and 930 or the control message processing unit 935 or demultiplexes data received from the transmission/reception unit 905 to transfer the data to the appropriate higher stratum processing units 925 and 930, the control message processing unit 935, or the controller 910.

For convenience of description, the configuration of the base station has been illustrated with the divided blocks. However, it should be understood that the configuration of the base station does not necessarily have to be divided as described above in the embodiment of the present disclosure. For example, the base station can be configured with a transmission/reception unit communicating with at least one node and a controller for controlling the overall operation of the base station. According to the embodiment of the present disclosure, the base station transfers a signal between the UE and the MME. That is, the base station transfers, to the MME, the signal received from the UE. In addition, the base station transfers, to the UE, the signal received from the MME.

It is obvious that the base station performs operations of connecting the UE and the MME in FIGS. 1 to 8.

Figure 10:
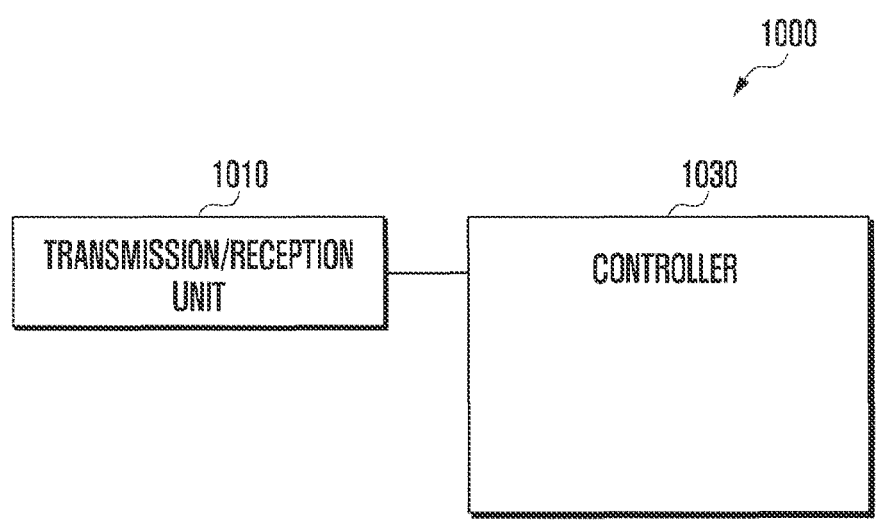
FIG. 10 is a block diagram illustrating a configuration of a mobility management entity according to an embodiment of the present disclosure.

FIG. 10 is a block diagram illustrating a Mobility Management Entity (MME) according to an embodiment of the present disclosure. Referring to FIG. 10, the mobility management entity 1000 includes a transmission/reception unit 1010 that communicates with at least one network node and a controller 1030 that controls the overall operation of the mobility management entity. The controller 1030 controlling the MME receives a power saving mode request from the UE and set a power saving mode. In addition, the controller 1030 controls to transmit timer related information relevant to the power saving mode. The controller 1030 controls the operations of FIGS. 1 to 7 between the UE and the MME.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for Power Saving Mode (PSM) operation control of a UE in a mobile communication system, comprising:
   setting a PSM for the UE;
   triggering a connection request of the UE in the PSM;
   determining whether the connection request has been barred;
   deactivating the PSM and changing to an active mode, when it is determined that the connection request has not been barred; and
   maintaining the PSM setting without changing to an idle mode, when it is determined that the connection request has been barred.

2. The method of claim 1, wherein the maintaining of the PSM setting comprises:
   maintaining the PSM setting until the expiration of a timer that bars a Radio Resource Control (RRC) connection setting for at least the connection request.

3. The method of claim 1, wherein the connection request comprises at least one of: a call, signaling, or a Circuit Switched (CS) fallback, which are generated from the UE.

4. The method of claim 1, wherein an operation corresponding to the connection request is barred for a time interval during which the PSM setting is maintained.

5. The method of claim 1, further comprising:
before the setting of the PSM, determining whether a timer barring the access of the UE is operating; and
deactivating the PSM setting operation when it is determined that the timer is operating.

6. The method of claim 1, further comprising:
before the setting of the PSM, determining whether a timer barring the access of the UE is operating; and
continuing to perform the timer operation and a timer related operation after the setting of the PSM when it is determined that the timer is operating.

7. The method of claim 1, further comprising:
before the setting of the PSM, determining whether a timer barring the access of the UE is operating; and
stopping a service request until the expiration of the timer by a UE Non-Access Stratum (NAS) in the setting of the PSM, when it is determined that the timer is operating.

8. A UE device capable of Power Saving Mode (PSM) operation control in a mobile communication system, comprising:
a transceiver configured to communicate with at least one network node; and
a controller configured to:
set a PSM for the UE,
trigger a connection request of the UE in the PSM,
determine whether the connection request has been barred,
deactivate the PSM and change to an active mode, when it is determined that the connection request has not been barred, and
maintain the PSM setting without changing to an idle mode, when it is determined that the connection request has been barred.

9. The UE device of claim 8, wherein the controller is configured to maintain the PSM setting until the expiration of a timer that bars a Radio Resource Control (RRC) connection setting for at least the connection request.

10. The UE device of claim 8, wherein the connection request comprises at least one of: a call, signaling, or a Circuit Switched (CS) fallback, which are generated from the UE.

11. The UE device of claim 8, wherein the controller is configured to bar an operation corresponding to the connection request for a time interval during which the PSM setting is maintained.

12. The UE device of claim 8, wherein the controller is configured to:
determine whether a timer barring the access of the UE is operating before the setting of the PSM, and
deactivate the PSM setting operation when it is determined that the timer is operating.

13. The UE device of claim 8, wherein the controller is configured to:
determine whether a timer barring the access of the UE is operating before the setting of the PSM, and
continue to perform the timer operation and a timer related operation after the setting of the PSM when it is determined that the timer is operating.

14. The UE device of claim 8, wherein the controller is configured to:
determine whether a timer barring the access of the UE is operating before the setting of the PSM, and
stop a service request until the expiration of the timer by a UE Non-Access Stratum (NAS) in the setting of the PSM, when it is determined that the timer is operating.

15. A non-transitory computer readable medium comprising a plurality of instructions configued to, when executed by a processor, cause the processor to:
set a Power Saving Mode (PSM) for a including the processor;
trigger a connection request of the device in the PSM;
determine whether the connection request has been barred;
deactivate the PSM and change to an active mode, when it is determined that the connection request has not been barred; and
maintain the PSM setting without changing to an idle mode, when it is determined that the connection request has been barred.

16. The non-transitory computer readable medium of claim 15, wherein the plurality of instructions further is configured to cause the processor to maintain the PSM setting until the expiration of a timer that bars a Radio Resource Control (RRC) connection setting for at least the connection request.

17. The non-transitory computer readable medium of claim 15, wherein the connection request comprises at least one of: a call, signaling, or a Circuit Switched (CS) fallback, which are generated from the UE.

18. The non-transitory computer readable medium of claim 15, wherein the plurality of instructions further is configured to cause the processor to bar an operation corresponding to the connection request for a time interval during which the PSM setting is maintained.

19. The non-transitory computer readable medium of claim 15, wherein the plurality of instructions further is configured to cause the processor to:
determine whether a timer barring the access of the UE is operating before the setting of the PSM, and
deactivate the PSM setting operation when it is determined that the timer is operating.

20. The non-transitory computer readable medium of claim 15, wherein the plurality of instructions further is configured to cause the processor to:
determine whether a timer barring the access of the UE is operating before the setting of the PSM, and
continue to perform the timer operation and a timer related operation after the setting of the PSM when it is determined that the timer is operating.

21. The non-transitory computer readable medium of claim 15, wherein the plurality of instructions further is configured to cause the processor to:
determine whether a timer barring the access of the UE is operating before the setting of the PSM, and
stop a service request until the expiration of the timer by a UE Non-Access Stratum (NAS) in the setting of the PSM, when it is determined that the timer is operating.

* * * * *